3,678,011
NOVEL POLYURETHANE-UREA COATING COMPOSITION AND CAST FILM

John Bernhard Hino, Cheektowaga, and Bernard Taub, Williamsville, N.Y., assignors to Allied Chemical Corporation, New York, N.Y.
No Drawing. Filed Jan. 13, 1970, Ser. No. 2,652
Int. Cl. C08g 17/00, 22/00; B32b 27/40
U.S. Cl. 260—75 NH                                    14 Claims

ABSTRACT OF THE DISCLOSURE

Production of a novel polyurethane-urea composition of low substantially constant viscosity by (1) reacting a hydroxy-terminated polymer and an excess of aromatic diisocyanate to produce an isocyanate-terminated prepolymer and (2) reacting said prepolymer with a 5-amino-1-methyl-3,3-bis(lower alkyl) cyclohexane methyl amine, and bis(lower alkyl) monoamine in a polar organic solvent. This composition applied as a coating provides a thermoplastic film of excellent mechanical properties on evaporation of the solvent.

CROSS REFERENCES TO RELATED APPLICATIONS

Copending, commonly assigned application of George S. Wooster and F. M. Delgado entitled "Polyurethane Lacquer Compositions," Ser. No. 836,598, filed June 25, 1969.

BACKGROUND OF THE INVENTION

Field of the invention

This invention relates to novel polyurethane compositions and more particularly to novel polyurethane-ureas. It is especially concerned with novel polyurethane-urea coating compositions of low, substantially constant viscosity derived from aromatic diisocyanates.

Description of the prior art

Organic solvent solutions of linearly-extended polyurethane-ureas provide, on evaporation of solvent, attractive coatings for both woven and non-woven fabrics. Heretofore use of such solutions in finishing and coating applications has been limited by the difficulty of preparing relatively concentrated polyurethane-urea solutions of relatively low viscosity which remains substantially constant on storage. For example, British Pat. 1,145,200 discloses production of a linearly extended polyurethane-urea in a polar organic solvent by reaction of an isocyanate-terminated prepolymer such as a prepolymer derived from an aromatic diisocyanate and at least a stoichiometric equivalent, based on the prepolymer, of a primary diamine. However, use of a stoichiometric equivalent of diamine in this process provides an excessively viscous or solid product unsuitable for coating. On the other hand, use of a stoichiometric excess of the diamine affords a polymer of undesirably short chain length, and hence, a coating of low tensile strength. However, according to page 4, lines 93–108 of the reference patent, removal of excess diamine during the polymerization entails the costly, tedious expedient of charging di- or tri-isocyanate to the reaction mass and thereafter stabilizing the viscosity of the product solution by reaction with acylating agent or monoisocyanate.

The disadvantages of the foregoing coating compositions are overcome in coating solutions prepared by reaction of isocyanate-terminated prepolymer derived from a reactive non-aromatic diisocyanate, less than a stoichiometric equivalent of a saturated diamine and a polymer chain-terminating agent such as a mono-hydroxy polar organic solvent and a bis-lower alkyl monoamine, that is, a secondary amine containing alkyl groups of 1 to 6 carbon atoms. The latter polyurethane-ureas have satisfactory viscosity characteristics and can be prepared from a wide variety of saturated diamines. Nevertheless, practical application of such coatings is limited by the difficulty and cost of preparing the non-aromatic diisocyanate precursors thereof.

It is the object of the present invention to prepare polyurethane-urea coating composition of low, substantially constant viscosity derived from aromatic diisocyanates.

This and other objects and advantages will be apparent from the following description of our invention.

SUMMARY OF THE INVENTION

The disadvantages of the aforementioned coating compositions are overcome and the above object is attained according to the invention in a novel polyurethane-urea coating composition of low, substantially constant viscosity comprising the product of reaction of (1) a diol of average molecular weight of about 350 to 5000 selected from hydroxy-terminated polyesters, hydroxy-terminated polyethers, and hydroxy-terminated polyester-polyethers with (2) an excess of an aromatic diisocyanate whereby an isocyanate-terminated prepolymer is formed and (3) subsequent reaction in a polar organic solvent of said prepolymer and about 0.8–0.9 equivalent per equivalent of prepolymer of a 5-amino-1-methyl-3-bis(lower alkyl) cyclohexane methylamine and about 0.1 to 0.2 equivalent per equivalent prepolymer of a bis-lower alkyl monoamine the weight ratio of solvent to dissolved polymer in said product being at least about 45:55.

DETAILED DESCRIPTION OF THE INVENTION AND OF THE PREFERRED EMBODIMENT THEREOF

Unexpectedly, the present novel compositions are polyurethane-urea solutions of exceptionally constant viscosity compared to similar polymer solutions prepared from saturated primary diamines other than those of the invention. Thus, the present novel compositions undergo less than about a 15% change in viscosity on being heated at moderately elevated temperature, for example at 65° C. for 24 hours, the aforementioned heating period being equivalent to storage for about 4 weeks or more at ambient temperature. Comparable polyurethane-urea compositions derived from saturated diamines other than those of the invention undergo viscosity changes in excess of about 50% or solidify during similar storage conditions. In general our novel polyurethane-urea compositions are of faint yellow color surprisingly lighter than the color of comparable polyurethane-urea solutions derived from other primary diamines, such as cycloaliphatic diamines typified by 1,8-p-menthane diamine or aromatic diamines typified by the diamine employed as chain extending agent in Example a/10 of aforementioned British Pat. 1,145,200. The novel solutions are characterized by relatively low viscosities at relatively high concentrations of dissolved polymer. Thus, in general, the novel compositions have a Brookfield viscosity at 25° C. below 500 poises even at a dissolved polymer concentration as great as about 55 weight percent. At lower polymer concentrations, for example about 30 weight percent dissolved polymer based on the weight of the solution, the viscosity of the novel compositions is less than about 200 poises at 25° C.

The novel compositions are prepared employing reaction conditions conventional in this art. The isocyanate-terminated prepolymer is prepared by reaction of a diol with an excess of aromatic diisocyanate. Preferably the latter reactants are charged in amounts to provide an NCO/OH ratios of 1:1 to 4.0:1 and especially of about 1.5:1 to about 2.5:1. Prepolymer formation is carried out at temperatures of about 40° to 130° C. advantageously at about 70° to 100° C. either in the melt or, advantageously in a solvent inert to isocyanates such as xylene, benzene, toluene and the like.

The resultant isocyanate-terminated prepolymer composition is subsequently chain-extended by reaction with about 0.8–0.9 equivalent of the diamine per equivalent prepolymer in a polar organic solvent preferably a polar organic solvent containing a lower aliphatic monohydroxy alcohol such as 2-methoxyethanol. The chain extension reaction is effected in the presence of about 0.1 to 0.2 equivalent of bis-lower alkyl monoamine per equivalent prepolymer charged. Preferably the ratio of the sum of diamine equivalents and monoamine equivalents to equivalents prepolymer is no greater than 1.0:1. According to the preferred embodiment of the invention wherein solvent containing a monohydroxy lower aliphatic alcohol is employed, the latter ratio is advantageously less than 1.0:1 for example about 0.95:1 to about 0.98:1. Because of the relatively low viscosity of the product solution, the polar organic solvent can be charged in a relatively small amount, in other words, in an amount sufficient to provide a weight ratio of solvent to dissolved resin of at least about 45:55. The preferred alcohol-containing solvent of the invention is also desirably charged in an amount providing a number of equivalents of alcohol per equivalents prepolymer at least equal to the numerical difference between the aforementioned amine-prepolymer ratio and 1:0 when the latter ratio is less than 1.0:1.

The chain extension reaction is generally exothermic and is conveniently effected at about ambient temperature to about 50° C. The resultant reaction mass is advantageously allowed to stand at ambient temperature for about 16 to 24 hours to insure completion of the reaction.

Aromatic diisocyanates which are suitable for preparation of the novel polyurethane-urea compositions are diisocyanates of the benzene and naphthalene series of which the following are typical examples:

2,4-toluene-diisocyanate
2,6-toluene-diisocyanates
diphenylmethane-4,4'-diisocyanate
diphenylmethane-3,3'-diisocyanate
diphenyl-dimethylmethane-4,4'-diisocyanates
2,2',6,6'-tetramethyl-diphenylmethane-4,4'-diisocyanate
diphenyl-4,4'-diisocyanate
diisopropyl phenylene diisocyanate
m-xylylene diisocyanate
p-xylylene diisocyanate
a,a,a'a'-tetramethyl p-xylylene diisocyanate
bis (3-methyl-1,4-isocyanato phenyl urea)
naphthalene-1,5-diisocyanate
naphthalene-1,3-diisocyanate Mixtures of these and equivalent diisocyanates, including the lower alkyl, lower alkoxy and halogen derivatives of the foregoing diisocyanates, can be employed also.

Preferably, an aromatic diisocyanate of the benzene series is employed in the practice of our invention, especially the readily available toluene diisocyanate mixture containing about 80 weight percent, 2,4-toluene diisocyanate and about 20 weight percent 2,6-toluene diisocyanate.

Suitable diols for use in preparing the coating compositions of the invention are hydroxy-terminated polyethers, polyesters or polyether-polyesters of an average molecular weight of about 350 to 5000, which contain two terminal hydroxy radicals. Typical suitable hydroxy-terminated polyethers include the following representative examples.

polyoxytetramethylene diols
hydroxy-terminated copolymers of:
    ethylene glycol and ethylene oxide
    neopentyl glycol and ethylene oxide
    1,2-propylene glycol and 1,2-propylene oxide
    2,2-bis (p-hydroxyphenyl)-propane and 1,2-propylene oxide
    a,a,a',a'-tetramethyl a,a'bis (p-hydroxyphenyl)p-xylene and ethylene oxide
    and tetrahydrofuran and 1,2-propylene oxide Typical suitable hydroxy-terminated polyesters include the following representative examples:

hydroxy-terminated polyepsilon caprolactone
hydroxy-terminated copolymers of
    1,2-propylene glycol and succinic acid
    1,3-propylene glycol and succinic acid
    diethyl glycol and phthalic acid
    1,4-butylene glycol and dimethyl maleic acid
    2,2-diethyl-1,3-propylene glycol and maleic acid
    2,2-diethyl-1,3-propylene glycol and isophthalic acid
    diethylene glycol and isophthalic acid
    ethylene glycol and 2-methyl terephthalic acid
    1,3-propylene glycol and tetrachloro terephthalic acid
    neopentyl glycol and adipic acid (neopentyl adipate polyester diol)
    neopentyl glycol and isophthalic acid (neopentyl isophthalate polyester diol), and
    diethylene glycol and adipic acid (diethylene glycol adipate polyester diol)

Typical suitable hydroxy-terminated polyester-polyethers are represented by hydroxy-terminated copolymers of any of the foregoing or equivalent polycarboxylic acids and the previously listed polyether diol.

Preferably the diols employed in the present process is a polyester diol or mixture of polyester diols. The preferred molecular weight of polyols employed in the invention is within the range of about 400 to 2500.

The primary diamine employed in preparing polyurethaneurea coating compositions according to the invention is a 5-amino-1-methyl 3,3-bis(lower alkyl) cyclohexane methylamine of which the following are representative examples:

5-amino-1,3,3-trimethyl cyclohexane methyl amine
5-amino-1-methyl-3-n-propyl-3-n-butyl cyclohexane methyl amine
5-amino-1,3-dimethyl-3-isopropyl cyclohexane methylamine
5-amino-1,3-dimethyl-3-tert butyl cyclohexyl methylamine
5-amino-1-methyl-3,3-di-n-hexylcyclohexane methylamine Preferably we employ as the primary diamine reactant of the invention, the readily available 5-amino-1,3,3-trimethylcyclohexane methylamine.

Bis(lower alkyl)monoamines suitable for preparation of the novel coating solutions of the invention contain alkyl groups of 1 to 6 carbon atoms. Typical suitable monoamines include the following representative examples:

di-n-butylamine
di-n-propylamine
di-n-hexylamine
di-isopropylamine
N-(n-pentyl)methylamine
N-(n-propyl)ethylamine
di(sec.butylamine)
N-(tert.butyl)ethylamine Preferably we employ di-n-butylamine in preparation of the coating composition of the invention.

The polar organic solvent charged in the chain-extension reaction also serves as solvent for the polyurethaneurea resin. Suitable solvents are volatile polar organic liquids conventionally designated "lacquer-type solvents" in this art. Representative examples of suitable polar organic solvents include the following as typical examples:

N,N-disubstituted lower aliphatic amides such as:

dimethyl formamide
diethyl formamide
dimethyl acetamide
N-formyl morpholine

Mono-hydroxy lower aliphatic alcohols such as:

2-methoxyethanol
isopropanol
sec. butyl alcohol
n-butanol
ethanol
2-ethoxyethanol Lower aliphatic esters such as:

ethyl acetate
2-methoxyethylacetate
2-methoxyethyl propionate
2-ethoxyethyl acetate
n-butyl acetate
methyl propionate Mixtures of the above and equivalent polar organic solvents with aromatic hydrocarbons such as benzene, xylene and toluene (including the alcoholic solvent mixtures prescribed by copending U.S. application Ser. No. 836,598. mentioned supra), are useful in this respect also.

Preferably we employ a polar organic solvent which contains a monohydroxy lower aliphatic alcohol. An especially good result is obtained according to the invention employing 2-methoxyethanol as the alcohol-containing polar organic solvent.

The present novel polyurethane-urea compositions are devoid of reactive isocyanate groups and exhibit no more than about a 15% change in viscosity on storage as previously described. The present coating compositions are characterized by a relatively low viscosity even when the concentration of the dissolved polymer is as great as about 55 weight percent. Accordingly the novel solutions are readily blended with insoluble inert pigments such as carbon black, titanium dioxide, as well as fungicides and other resins.

The polyurethane-urea composition of the invention can be used directly as coating compositions to obtain thermoplastic films of excellent mechanical properties, such as excellent tensile strength, and elasticity as is illustrated in Example 7 below. The novel coating compositions can be applied to woven and non-woven fabric substrates by conventional methods such as, spraying, brushing, knifing, flow-coating and the like. The resultant films are cured or dried by conventional methods of evaporating the solvent therein, for example, by evaporation at ambient or elevated temperature. As illustrated in Example 8 below, the present polyurethane-ureas are particularly suited to manufacture of tough, attractive polyurethane-urea fabric laminates having the appearance of leather.

Such laminates are prepared by coating one surface of a releasable backing or carrier with the polyurethane-urea solution which may if desired contain dispersed pigment, drying the resultant coating to a tack-free state, coating an adhesive on the surface of the resultant polyurethane-urea film, applying a fabric layer to the adhesive surface, heating the resultant laminate at a moderate temperature to cure the adhesive and thereafter stripping the releasable backing from the finished laminate.

In general the polyurethane-urea solution is coated on the releasable backing in an amount sufficient to provide a layer of from about 1 to 3 oz. per sq. yard (corresponding to about 34 to 102 g. per sq. m.) on a dry weight basis. The adhesive is coated on the tack-free polyurethane-urea to provide an adhesive layer of less than about 0.5 oz. per sq. yard (corresponding to less than about 17 g. per sq. m.) on a dry weight basis. To cure the adhesive layer, the fabric laminate is heated at a moderate temperature, that is at about 50–150° C. for a brief period, say 1 to 10 minutes.

The releasable backing or carrier to which the polyurethane-urea solution is applied may be any transporting vehicle to which the cured polyurethane-urea will not adhere, for example release paper, "Teflon," polypropylene, polyethylene or metal coated with a release agent such as a silicone. Especially suitable for this purpose is release paper, that is paper treated with a suitable release agent such as silicone. Release paper having an embossed pattern may be utilized to impart a pattern to the laminate for example, a leather like grain. Alternatively smooth surface release paper is used to provide a fabric laminate of simulated patent leather finish.

Any of a variety of known adhesives can be used for the intermediate adhesive layer. For example polyurethane adhesives of the two package variety such as "Adiprene L–100," a liquid poly(1,4-oxybutylene glycol)-based urethane prepolymer (E. I. Du Pont Co.) cured with a suitable diamine such as 4,4'-methylene bis(o-chloroaniline) as well as similar urethane products available under the trade names "Daltoflex A–10" (Imperial Chemical Industries), "Urelane 8085" (Furane Plastics Co.) and the like provide excellent bonding. The preparation of such two package urethane adhesives is well known and is disclosed in Saunders et al., "Polyurethanes," Part II, pages 611–613 (1964). A polyurethane-urea solution of the invention can also be utilized as the adhesive layer. According to this mode of operation, the polyurethane-urea solution is applied to the tack-free polyurethane-urea outer layer and dried to a tacky state before application of the fabric. Especially preferred adhesives for preparation of the present laminates are self-reactive acrylic resins including polymeric derivatives of acrylic, and methacrylic acid their esters, amides and nitriles, for example acrylonitrile which contain functional groups capable of leading to further reaction resulting in a polymer derived from acrylic monomers. Suitable self-reactive acrylic resins also include copolymers derived from mixtures of acrylic monomers and other monomers such as styrene, butadiene, vinyl toluene and maleic esters. The preparation of such self-reactive acrylic resins has been described in numerous references including Kansawa et al., Japanese Chem. Quarterly II–IV, 41 (1966). An especially good result is obtained according to the invention employing the following self-reactive acrylic resins as adhesives:

J. P. Stevens Co. Adhesive No .162
Crown Flock Adhesive N.V.
Camotex 6810 (Cambridge Chemical Co.)

A wide variety of fabrics can be coated or laminated with the polyurethane-ureas of the present invention in accordance with the foregoing techniques. The choice of a particular fabric will depend on the ultimate use of the laminated or coated fabric for example use as either apparel, furniture, upholstery, automotive upholstery or interior trim. The fabric may be woven or non-woven for example, felt and fabric flock. Suitable fabrics which can be coated or laminated in accordance with the invention include nylon such as polyhexamethylene adipamide and poly-epsilon-caprolactam, cotton, rayon, silk, polyester such as cellulose triacetate and polyethylene terephthalate, wool and the like.

In the following examples which serve to illustrate our invention parts, percentages, and proportions are by weight unless otherwise noted and temperatures are in degrees centigrade.

EXAMPLE 1

A mixture of 500 parts (0.572 equivalent) of a neopentyl adipate polyester diol (equivalent weight 875), 123 parts (0.424 equivalent) of neopentyl isophthalate polyester diol (equivalent weight 290) and 259 parts toluene is dried azeotropic distillation at atmospheric pressure. A Dean-Stark trap is employed to collect the condensed toluene-water azeotrope and to recycle the separated toluene layer of the azeotrope to the still. The resultant dried distilland is cooled to about 60° agitated with 155.9 parts (1.792 equivalents corresponding to about 1.8 equivalents per equivalent of diol) of a toluene-diisocyanate mixture (consisting of about 80% 2,4- and about 20% 2,6-toluenediisocyanates) at 100° for 1.5 hours. The reaction mass is cooled to ambient temperature to obtain a toluene solution of isocyanate-terminated prepolymer having an amine equivalent of 1265 and containing 75% dissolved non-volatiles.

To 1000 parts of the aforementioned prepolymer solution (containing 0.79 isocyanate equivalents) there is charged over a three minute period, a solution of 57.11 parts (0.671 equivalent corresponding to about 0.85 equivalent per equivalent prepolymer) of 5-amino-1,3,3-trimethylcyclohexane methylamine and 11.24 parts (0.087 equivalent corresponding to about 0.11 equivalent per equivalent prepolymer) of di-n-butylamine in 454 parts of 2-methoxyethanol. After addition of about 114 parts of 2-methoxy-ethanol, the polymerization mass (containing 568 parts, 7.48 equivalents corresponding to about 9.5 equivalent per equivalent prepolymer of the 2-methoxy ethanol), is agitated for about 30 minutes (during which period the temperature of the mass increases by about 10 to 15°). The resultant solution is allowed to stand at ambient temperature for about 24 hours. There is thus obtained a polyurethane urea coating solution (containing 50% dissolved non-volatiles) having a Brookfield viscosity of 89.00 poises (determined at 25°) and a very faint yellow color of 100 A.P.H.A. Units (Hazen platinum-cobalt scale, determined with a Hellige Aqua Tester).

A sample of the product is maintained at 65° for 24 hours. The resultant product has a viscosity of 80.40 poises (corresponding to a decrease in viscosity of about 9.7%) and a color of 125 A.P.H.A. units. The foregoing relatively small change in viscosity on heating is indicative of the stability of the present product.

Application of the product in admixture with inert pigment to a woven cotton fabric in conjunction with an adhesive by a procedure provides an attractive leather-like finish as disclosed in Example 8 below.

EXAMPLE 2

The procedure of Example 1 is repeated substantially as described employing an isocyanate-terminated prepolymer prepared from:

650 parts (1.275 equivalents) of a diethylene glycol adipic acid polyester diol of equivalent weight 510.
221.9 parts (2.55 equivalents corresponding to 2.0 equivalents per equivalent of diol) of the toluene diisocyanate mixture of Example 1.
291 parts of toluene.

A 1000 part portion the resultant prepolymer solution (amine equivalent 940; 1063 isocyanate equivalents, 75% dissolved non-volatiles) is treated with 76.86 parts (0.903 equivalent corresponding to 0.85 equivalent per equivalent prepolymer) of 5 - amino - 1,3,3 - trimethyl cyclohexane methylamine, 15.13 parts (0.117 equivalent corresponding to 0.11 equivalent per equivalent prepolymer) of di-n-butylamine and 592 parts (7.78 equivalents corresponding to about 7.32 equivalents per equivalent prepolymer) 2-methoxyethanol and allowed to stand at ambient temperature for 24 hours. The resultant polyurethane urea solution (containing 50% dissolved non-volatiles) has a color of 100 A.P.H.A. units and a Brookfield viscosity of 208 poises (at 25°). After being maintained at 65° for 24 hours, a sample of the product has a faint yellow color of 150 A.P.H.A. units and a viscosity of 186 poises (corresponding to about a 10.6% decrease in viscosity). This stable coating composition also provides an attractive fabric finish of the type disclosed in Example 1.

EXAMPLE 3

The procedure of Example 1 is repeated substantially as described employing an isocyanate-terminated prepolymer prepared from:
638 parts (1.5 equivalents) of a neopentyl adipate polyester diol of equivalent weight 425.
261 parts (3.0 equivalents corresponding to 2.0 equivalents per equivalent of the diol) of the diisocyanate mixture of Example 1.
301 parts toluene.

A 200 part portion of the resultant prepolymer solution (amine equivalent 815, 0.245 isocyanate equivalents 75% dissolved non-volatiles) is treated with 18.15 parts (0.213 equivalent, corresponding to about 0.87 equivalent per equivalent prepolymer) of 5-amino-1,3,3-trimethyl cyclohexane methylamine, 2.85 parts (0.0221 equivalent, corresponding to about 0.09 equivalent per equivalent prepolymer) of di-n-butylamine and 121 parts (1.59 equivalents, about 6.5 equivalents per equivalent prepolymer) of 2-methoxyethanol. The mixture is allowed to stand at ambient temperature for 24 hours. The resultant poly urethane urea coating solution (containing 50% dissolved non-volatiles) has a Brookfield viscosity of 464 poises (determined at 25°) and yields an excellent fabric finish of the type disclosed in Example 1.

EXAMPLE 4

A toluene prepolymer solution of amine equivalent 1050 (containing 75% dissolved non-volatiles) is prepared substantially as described in Example 1 employing about 2.0 equivalents as diisocyanate per equivalent diol. A 400 part portion (containing 0.381 isocyanate equivalent) of the prepolymer solution is treated with 27.52 parts (0.323 equivalent corresponding to about 0.85 equivalent per equivalent prepolymer) of 5-amino-1,3,3-trimethyl cyclohexane methylamine, 5.42 parts (0.0419 equivalent corresponding to 0.11 equivalent per equivalent prepolymer) of di-n-butylamine and 233 parts (3.06 equivalents, about 8.04 equivalents per equivalent prepolymer) 2-methoxyethanol. On completion of the polymerization reaction, the mass is maintained at ambient temperature for 24 hours. The resultant polyurethane urea solution (containing 50% dissolved non-volatiles) has a Brookfield viscosity (25°) of 134.6 poises and a faint yellow color of 135 A.P.H.A. units. After standing at 65° for 24 hours a sample of this product has a viscosity of 125 poises (corresponding to about a 7.13% decrease in viscosity) and a light yellow color of 175 A.P.H.A. units.

The viscosity stable product also provides excellent attractive fabric finishes of the type disclosed in Example 1.

The following comparative Examples 5 and 6 illustrate unsuccessful attempts to prepare viscosity-stable polyurethane urea compositions employing diamine reactants other than those of the invention.

EXAMPLE 5

The procedure of Example 1 is repeated substantially as described except that 995 parts (0.772 equivalent) of the toluene solution of prepolymer (amine equivalent 1290, 75% dissolved non-volatiles) is treated with 55.73 parts (0.655 equivalent corresponding to 0.85 equivalent per equivalent prepolymer) of 1,8-p-menthane diamine, 10.97 parts (0.0849 equivalent corresponding to 0.11 equivalent per equivalent prepolymer of di-n-butylamine and 564 parts (7.42 equivalent, about 9.6 equivalent per equivalent prepolymer) of 2-methoxy-ethanol. The reaction product (containing 50% dissolved non-volatiles) after standing at ambient temperature for 24 hours has a light yellow color of 175 A.P.H.A. units (i.e. 75% greater than the color of the corresponding sample of Example 1) and a Brookfield viscosity at 25° of 350 poises. After being maintained at 65° for 24 hours, a sample of this product has a yellow color of 250 A.P.H.A. units (i.e. 100% greater than the color of the corresponding sample of Example 1) and a viscosity of 170 poises (corresponding to a viscosity decrease of about 51.5%). The large change in viscosity of the heated sample is indicative of instability of the product compared to the polyurethane urea coating solution of Example 1.

EXAMPLE 6

The procedure of Example 4 is repeated substantially as described except that 30.8 parts (0.324 equivalent, corresponding to about 0.85 equivalent per equivalent prepolymer) of a polyoxypropylene diamine of an equivalent weight of about 95 is charged in place of the 5-amino-1,3,3-cyclohexane methylamine and 236.2 parts (3.1 equivalents corresponding to about 8.15 equivalent per equivalent of the prepolymer) of 2-methoxyethanol are charged to provide a polyurethane urea solution containing 50% dissolved non-volatiles. On standing at ambient temperature for only about 3 hours this product solidifies to gelatinous mass unsuitable for coating application. Similar undesirable results are obtained by employing a stoichiometric equivalent of ethylene diamine or an 80:20 mixture of 2,4- and 2,6-diamino methyl cyclohexane in place of the diamine of Example 4.

The following Examples 7 and 8 illustrate, respectively preparation of pigmented thermoplastic films and manufacture of leather-like coated fabrics from the polyurethane-urea coating compositions of the invention.

EXAMPLE 7

A polyurethane urea solution prepared substantially in accordance with the procedure of Example 1 is admixed with carbon black to give a pigmented coating composition containing 44.3% non-volatiles of which 6.0% is dispersed carbon pigment and 94.0% is the dissolved polyurethane-urea resin. The lacquer is knifed onto a flat Teflon substrate. After evaporation of the solvent, the resultant black film is stripped from the substrate. The resultant thermoplastic film has the following excellent mechanical properties:

Tensile strength, p.s.i.: 2670 (corresponding to 188 kg./cm.$^2$)
Elongation, percent: 370
100% modulus, p.s.i.: 1330 (corresponding to 93.4 kg./cm.$^2$)
Tensile yield, p.s.i.: 610 (corresponding to 42.8 kg./cm.$^2$)

EXAMPLE 8

A layer (about 1.0 oz./sq. yd. corresponding to 33.9 g./sq. m.) of a liquid pigmented coating composition prepared substantially as disclosed in Example 7 is knifed onto the surface of a sheet of Stripkote VEL Duplex release paper. The coated paper is placed in a preheated oven at 100° for 10 minutes to evaporate the solvent from the coating composition.

An emulsion of self-reactive acrylic adhesive (J. P. Stevens Co. No. 162) is rolled onto the surface of the polyurethane urea coating in an amount equivalent to about 0.2 oz./sq. yd. (corresponding to 6.78 g./sq. m.) on a dry weight basis. A napped cotton sateen fabric (8 oz./sq. yd. corresponding to 2.61 g./sq. m.) is pressed onto the adhesive surface, heated in an oven at about 120° for about 5 minutes, and cooled to ambient temperature. The release paper is then peeled from the coated fabric. The resultant coated fabric (an acrylic adhesive-bound polyurethane urea fabric laminate) has the appearance of black leather providing a tough yet esthetically appealing surface well suited for use in manufacturing upholstery, wearing apparel and the like.

We claim:

1. A polyurethane-urea coating composition of low, substantially constant viscosity, said composition comprising the product of reaction of (1) a diol of average molecular weight of about 350 to 5000 selected from hydroxy-terminated polyesters, hydroxy-terminated polyethers, hydroxy-terminated polyester-polyethers with (2) an excess of an aromatic diisocyanate whereby an isocyanate-terminated prepolymer is formed and (3) subsequent reaction in a polar organic solvent of said prepolymer with about 0.8 to 0.9 equivalent per equivalent prepolymer of a 5-amino-1-methyl-3,3-bis(lower alkyl) cyclohexane methylamine and about 0.1 to 0.2 equivalent per equivalent prepolymer of a bis-(lower alkyl)monoamine, the weight ratio of solvent to polymer in said product being at least about 45:55.

2. A composition as defined in claim 1 wherein the diol has an average molecular weight of about 400 to 2500.

3. A composition as defined in claim 1 wherein the diol is a hydroxy-terminated polyester.

4. A composition as defined in claim 1 wherein the aromatic diisocyanate is an aromatic diisocyanate of the benzene series.

5. A composition as defined in claim 1 wherein the polar organic solvent contains a monohydroxy lower aliphatic alcohol.

6. A composition as defined in claim 1 wherein the isocyanate-terminated prepolymer is the reaction product of about 1.1 to 4.0 equivalents of aromatic diisocyanate per equivalent of polyol.

7. A composition as defined in claim 6 wherein the isocyanate-terminated prepolymer is the reaction product of about 1.5 to 2.5 equivalents of aromatic diisocyanates per equivalent of diol.

8. A composition as defined in claim 1 wherein the sum of the equivalents of the 5-amino-1-methyl-3,3-bis-(lower alkyl)cyclohexane methylamine and of the monoamine to equivalents prepolymer is no greater that 1.0:1.

9. A composition as defined in claim 5 wherein the sum of the equivalents of the 5-amino-1-methyl-3,3-bis-(loweralkyl)cyclohexane methylamine and of the monoamine to equivalents prepolymer is about 0.95 to 0.98:1.

10. A composition as defined in claim 7 wherein the diol is a polyester diol having an average molecular weight in the range of about 400 to 2500, the aromatic diisocyanate is an aromatic diisocyanate of the benzene series, the polar organic solvent contains a monohydroxy lower aliphatic alcohol, and the ratio of the sum of equivalents of the 5-amino-1-methyl-3,3-bis(lower alkyl)cyclohexane methylamine and of the bis-(loweralkyl)monoamine, to equivalents prepolymer is less than 1.0:1, the equivalents of the alcohol per equivalents of prepolymer being at least equal to the numerical difference of said ratio and 1.0.

11. A composition as defined in claim 10 wherein the aromatic diisocyanate of the benzene series is a mixture of about 80% 2,4- and about 20% 2,6-toluenediisocyanate, the polyester diol is a mixture of a neopentyl adipate of average molecular weight 1750 and a neopentyl isophthalate of average molecular weight 580, the monohydroxy lower aliphatic alcohol is 2-methoxyethanol, the 5 - amino - 1 - methyl - 3,3 - bis - (lower alkyl)cyclohexane methylamine is 5 - amino - 1,3,3 - trimethylcyclohexane methylamine and the bis(lower alkyl) monoamine is di-(n-butyl)amine.

12. A composition as defined in claim 10 wherein the aromatic diisocyanate of the benzene series is a mixture of about 80 weight percent 2,4- and about 20 weight percent 2,6-toluenediisocyanates, the polyester diol is a copolymer of diethylene glycol and adipic acid of average molecular weight 1010, the monohydroxy lower aliphatic alcohol is 2-methoxyethanol, the 5 - amino - 1 - methyl-3,3-bis(lower alkyl) cyclohexane methylamine is 5-amino-1,3,3-trimethyl cyclohexane methylamine, and the bis (lower alkyl) monoamine is di-(n-butyl)amine.

13. A composition as defined in claim 10 wherein the aromatic diisocyanate of the benzene series is a mixture of about 80 weight percent 2,4- and about 20 weight percent 2,6-toluenediisocyanates, the polyester diol is a neopentyl adipate of average molecular weight 850, the monohydroxy lower aliphatic alcohol is 2-methoxyethanol, the 5 - amino - 1 - methyl - 3,3 - bis(lower alkyl)cyclohexane methylamine is 5 - amino - 1,3,3 - trimethylcyclohexanaemethyl and the bis(lower alkyl) monoamine is di-(n-butyl)amine.

14. An elastic polyurethane-urea film prepared by a process comprising the steps of applying a liquid coating of the composition defined in claim 1 to a substrate, evaporating the solvent from said liquid coating and separating the resultant solidified film from said substrate.

References Cited

UNITED STATES PATENTS

| | | | |
|---|---|---|---|
| 2,721,811 | 10/1955 | Dacey et al. | 156—110 A |
| 3,288,732 | 11/1966 | Chapman et al. | 260—2.5 |
| 3,351,676 | 11/1967 | Saunders et al. | 260—859 |
| 3,461,103 | 8/1969 | Keberle et al. | 260—75 |
| 3,503,934 | 3/1970 | Chilvers | 260—75 |

OTHER REFERENCES

Fieser, L. F. and Fieser, M.: "Advanced Organic Chemistry" New York, N.Y., Reinhold Publishing Corp., (1961), copy owned by Examiner W. E. Hoag, Group 163, p. 424 and frontispiece.

Lange, N.A.: "Handbook of Chemistry" Handbook Publishers, Inc., Sandusky, Ohio (1946), copy in Group 163, p. 604 and frontispiece.

ROBERT F. BURNETT, Primary Examiner

C. B. COSBY, Assistant Examiner

U.S. Cl. X.R.

117—76 T, 161 KP; 156—246, 249; 161—196, 227, 159; 260—77.5 AN